(12) United States Patent
Faust

(10) Patent No.: US 10,432,817 B2
(45) Date of Patent: Oct. 1, 2019

(54) SYSTEM, APPARATUS AND METHOD FOR ENHANCING METADATA REGISTRATION WORKFLOW

(71) Applicant: Dennis Faust, Downingtown, PA (US)

(72) Inventor: Dennis Faust, Downingtown, PA (US)

(73) Assignee: RICOH COMPANY, LTD., Tokyo (JP)

(*) Notice: Subject to any disclaimer, the term of this patent is extended or adjusted under 35 U.S.C. 154(b) by 892 days.

(21) Appl. No.: 14/164,091

(22) Filed: Jan. 24, 2014

(65) Prior Publication Data

US 2015/0215491 A1 Jul. 30, 2015

(51) Int. Cl.
*H04N 1/32* (2006.01)
*G06F 16/38* (2019.01)
*G06F 17/24* (2006.01)
*H04N 1/00* (2006.01)

(52) U.S. Cl.
CPC ......... *H04N 1/32133* (2013.01); *G06F 16/38* (2019.01); *G06F 17/241* (2013.01); *H04N 1/00408* (2013.01); *H04N 1/00514* (2013.01); *H04N 1/00517* (2013.01); *H04N 2201/0081* (2013.01); *H04N 2201/0094* (2013.01)

(58) Field of Classification Search
CPC .......... H04N 1/00517; H04N 1/32133; H04N 1/00408; H04N 1/00514; G06F 17/241; G06F 17/30722; G06F 16/38
See application file for complete search history.

(56) References Cited

U.S. PATENT DOCUMENTS

| | | | | |
|---|---|---|---|---|
| 6,151,584 A | * | 11/2000 | Papierniak | G06Q 30/02 705/7.32 |
| 6,285,842 B1 | * | 9/2001 | Katamoto | H04N 1/00352 399/14 |
| 7,325,076 B1 | * | 1/2008 | Morrison | G06F 19/328 709/203 |
| 7,698,159 B2 | * | 4/2010 | Metzger | G06Q 10/10 705/2 |
| 2002/0051241 A1 | * | 5/2002 | Ogino | H04N 1/0035 358/474 |
| 2004/0044763 A1 | * | 3/2004 | Besson | G06Q 10/10 709/224 |
| 2004/0070613 A1 | * | 4/2004 | Sprague | G06F 17/3089 715/762 |
| 2006/0212455 A1 | * | 9/2006 | Perry | G06F 17/30265 |
| 2007/0027894 A1 | * | 2/2007 | Bridges | G06Q 10/00 |
| 2007/0027895 A1 | * | 2/2007 | Bridges | G06Q 10/10 |
| 2008/0174819 A1 | * | 7/2008 | Hada | G03G 15/5004 358/1.15 |
| 2009/0281862 A1 | * | 11/2009 | Conescu | G06Q 10/0633 705/7.27 |
| 2011/0040813 A1 | * | 2/2011 | Oue | H04N 1/00204 707/825 |

(Continued)

OTHER PUBLICATIONS

U.S. Appl. No. 14/164,069, Dennis Faust, filed Jan. 24, 2014.

*Primary Examiner* — Robert W Beausoliel, Jr.
*Assistant Examiner* — Susan F Rayyan
(74) *Attorney, Agent, or Firm* — Duft & Bornsen, PC

(57) ABSTRACT

Systems, apparatuses and methods are provided to enhance metadata registration workflow, such as in a multi-functional apparatus. User selection of metadata items and entry of metadata are captured to form a customized workflow to minimize performance by the user of redundant tasks.

20 Claims, 21 Drawing Sheets

(56) References Cited

U.S. PATENT DOCUMENTS

| | | | |
|---|---|---|---|
| 2011/0093432 A1* | 4/2011 | Su | G06Q 10/10 |
| | | | 707/608 |
| 2012/0116980 A1* | 5/2012 | Mercuri | G06Q 10/103 |
| | | | 705/301 |
| 2012/0243029 A1* | 9/2012 | St. Jacques, Jr. | G06F 3/1204 |
| | | | 358/1.15 |
| 2013/0179208 A1* | 7/2013 | Chung | G06Q 10/06 |
| | | | 705/7.15 |
| 2014/0075412 A1* | 3/2014 | Kannan | H04L 41/5016 |
| | | | 717/120 |
| 2014/0268212 A1* | 9/2014 | Pangrazio, III | H04N 1/00037 |
| | | | 358/1.15 |
| 2014/0317595 A1* | 10/2014 | Kilby | G06Q 10/06316 |
| | | | 717/105 |
| 2015/0178062 A1* | 6/2015 | Adderly | G06F 8/65 |
| | | | 717/170 |
| 2016/0134763 A1* | 5/2016 | Haapanen | H04N 1/001 |
| | | | 358/1.15 |
| 2016/0182747 A1* | 6/2016 | Zahoran | H04N 1/00408 |
| | | | 358/474 |

* cited by examiner

Account:
IMAKAROV

User:
Ivan Makarov

Please Select the Document Type

| References | Charts | Lab Samples |
| Projects | Manuals | Prototypes |
| Presentations | Research | Blueprints |
| Confidential Items | Equipment | Memos |

Log out

← Back

Next →

Fig. 6C

Account:
IMAKAROV

User:
Ivan Makarov

Please Enter the Client Number

123456        *Error: Number Too Long

| 7 | 8 | 9 |
| 4 | 5 | 6 |
| 1 | 2 | 3 |
| Del | 0 | Sym |

Log out

← Back

Next →

Fig. 6D

Pre-Scan Summary

| | |
|---|---|
| Account: | |
| IMAKAROV | |
| User: | |
| Ivan Makarov | Document Category: Engineering |
| | Document Type: Project |
| | Project Name: Wild Penguin Habitat |
| | Location (Country): Russia |
| | Place documents in ADF or glass platen and press "Scan" |
| Log out | ⇐ Back        Scan ⇒ |

Fig. 6I

Post-Scan Summary

| | |
|---|---|
| Account: | |
| IMAKAROV | |
| User: | Document Category: Engineering |
| Ivan Makarov | Document Type: Project |
| | Project Name: Wild Penguin Habitat |
| | Location (Country): Russia |
| | The submission was successful, ready for next scan. |
| Log out | ⇐ Cancel   Save Workflow   Scan Add. Docs. |

Fig. 6J

Account:
JMAKAROV

User:
Ivan Makarov

Please Name Your Workflow

Name: Penguin Habitat

Log out

Cancel

Next

Fig. 6K

Account:
JMAKAROV

User:
Ivan Makarov

Please Select a Workflow Trigger Part to be Associated with Your Workflow

Send by E-mail  ○

Send by E-mail and to Folder  ○

Send to Folder  ○

None  ●

Log out

Back

Next

Fig. 6L

Account:
IMAKAROV

User:
Ivan Makarov

Pre-Scan Summary

Workflow: Default Workflow

| | | |
|---|---|---|
| Document Category: | Company | ☒ |
| Document Type: | Administrative | ☒ |
| Report: | General | ☐ |
| Form: | O90 | ☒ |

Log out ⇐ Back    Scan ⇒

Fig. 6O

Account:
IMAKAROV

User:
Ivan Makarov

Post-Scan Summary

Workflow: Penguin Habitat

| | | |
|---|---|---|
| Document Category: | Engineering | ☒ |
| Document Type: | Project | ☐ |
| Project Name: | Wild Penguin Habitat | ☒ |
| Location (Country): | Russia | ☒ |

The submission was successful, ready for next scan.

Log out ⇐ Back    Save Workflow    Scan Add. Docs.

Fig. 6P

Account:
IMAKAROV

User:
Ivan Makarov

Log out

Post-Scan Summary

Workflow: Default Workflow

| | | |
|---|---|---|
| Document Category: | Company | ☒ |
| Document Type: | Administrative | ☒ |
| Report: | Specific | ☒ |
| Form: | O90 | ☒ |

The submission was successful, ready for next scan.

Back | Save Workflow | Scan Add. Docs.

SYSTEM, APPARATUS AND METHOD FOR ENHANCING METADATA REGISTRATION WORKFLOW

TECHNICAL FIELD

This disclosure relates to tools (such as systems, apparatuses, methodologies, computer program products, etc.) for adding metadata to a document and more particularly, for enhancing metadata registration workflow, for example, in a multi-functional apparatus having scan functionality.

BACKGROUND

In the current information age, information technology (IT) tools play a significant role in our daily activities, and there are often discussions of the desirableness of a paperless society. IT tools such as scanners and multi-function printers (MFP) are utilized to convert hardcopy documents into electronic form, thereby decreasing the need for physical storage space and at the same time allowing the information in the paper documents to be transmitted quickly and more readily.

When a hardcopy document is scanned using a conventional scanner or MFP, the user may be permitted to change scan settings and configurations. However, in conventional MFPs, the user usually does not have the capability of adding data, such as metadata (e.g., data regarding the scanned document and not shown in the document image), to the file containing the scan output. In the conventional art, even when a MFP allows the user to add metadata to the output file containing the scanned document, the process for adding metadata is highly repetitive when a collection of documents is to be scanned.

There is a need for an improved approach that streamlines registration of metadata in connection with documents.

SUMMARY

Various tools (for example, a system, an apparatus, application software, etc.) can be provided to enhance metadata registration workflow, such as in a multi-functional apparatus having scan functionality For example, in a multi-function apparatus comprising an operational display and a document scanner to scan a document, a metadata interface may be configured to provide one or more metadata entry screens on the operational display, in a default workflow, for user entry of metadata to be associated with a scanned document, and upon user confirmation of the metadata entered through the metadata entry screens by the user, such metadata entered through the metadata entry screens is captured, and the metadata entry screens is thereafter customized based on the captured metadata, and registered as a customized workflow of the particular user. At a later time, upon sign-on by that same user after the customized workflow has been registered, the customized workflow is provided through the metadata interface for user selection in connection with another document scanned or to be scanned by the document scanner.

In another aspect, a metadata workflow control part may be provided in the apparatus to control the metadata interface to display a summary of the entered metadata on the operational display, for user confirmation, prior to registration of the entered metadata in association with the scanned document.

Further, the metadata interface may be configured to provide one or more pre-scan metadata entry screens on the operational display of the multi-function apparatus, prior to scanning of the document, and the metadata interface displays a pre-scan summary of metadata entered via the one or more pre-scan metadata entry screens. The metadata items individually displayed in the pre-scan summary may be selected by default, and the metadata interface can permit the particular user to de-select a metadata item, on an item-by-item basis. Only metadata associated with the selected metadata items would be registered with the scanned document.

Alternatively, or additionally, the metadata interface may be configured to provide one or more post-scan metadata entry screens on the operational display of the multi-function apparatus, and the metadata interface displays a post-scan summary of metadata entered via the one or more post-scan metadata entry screens, for user confirmation, prior to registration of the entered metadata in association with the scanned document. Metadata items individually displayed in the post-scan summary are selected by default, and the metadata interface can permit the particular user to de-select a metadata item, on an item-by-item basis.

In another aspect, the multi-function apparatus may be configured to further comprise an application user interface. Upon sign-on by the user to the multi-function apparatus after the customized workflow has been registered, the application user interface causes a workflow trigger part to be added to an application screen, for the user to trigger the customized workflow.

In another aspect, prior to registration of a customized workflow, the metadata entry screens follow a default workflow, and the default workflow includes a default candidate data list. The metadata interface provides the default candidate data list for user selection of metadata to be associated with the scanned document. On the other hand, after registration of the customized workflow, the customized workflow includes a customized candidate data list corresponding to the default candidate data list, the customized candidate data list includes one or more data that was entered by the particular user and that is not on the default candidate data list.

In another aspect, the metadata interface may be configured to employ the captured metadata to populate the metadata entry screens for another document scanned by the particular user, and requests the particular user to confirm or replace the metadata automatically inserted in the metadata entry screens for said another document.

In another aspect, the multi-function apparatus may be configured to further comprise a workflow edit interface to edit the customized workflow after the customized workflow has been registered. Such workflow edit interface can be configured to provide each of the captured metadata registered with the customized metadata entry screens, and selected by default, for unselection by the user, and unselected metadata is not retained in the customized workflow. When the customized workflow is invoked for another document, the user is prompted to enter another metadata at a portion of the customized that was associated with the unselected metadata.

In another aspect, the metadata interface may be configured to provide a data selection interface for user selection of data from a database accessible from the multi-function apparatus, to be associated as metadata to the scanned document. In such example, the metadata interface causes the data selected from the database to be displayed on the operational display of the multi-function apparatus, for user confirmation, prior to registration of the data as metadata in association with the scanned document.

Many other aspects and features that can enhance metadata registration workflow are discussed infra.

BRIEF DESCRIPTION OF THE DRAWINGS

The aforementioned and other aspects, features and advantages can be more readily understood from the following detailed description with reference to the accompanying drawings wherein:

FIGS. 8A-8H show examples of user interface display screens displayed on an apparatus having scanning functionality, according to an exemplary embodiment.

DETAILED DESCRIPTION

Figure 1:
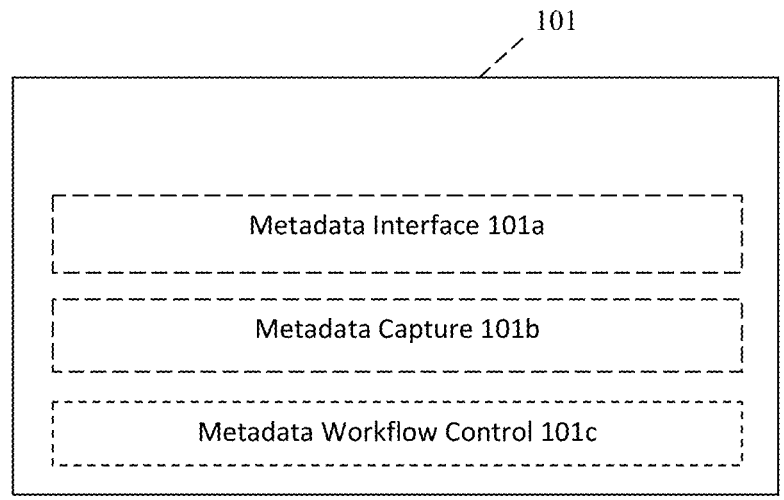
FIG. 1 shows a block diagram of an apparatus for enhancing metadata registration workflow, according to an exemplary embodiment, in a device having scanning functionality.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (systems, apparatuses, methodologies, computer program products, etc.) for communicating with a client device that is not configured to conform to a specific certification protocol in a public key infrastructure.

FIG. 1 shows schematically a diagram of an MFP 101 according to an exemplary embodiment. The MFP 101 includes a metadata interface 101*a*, a metadata capture part 101*b* and a metadata workflow control part 101*c*.

The metadata interface 101*a* provides a user with one or more metadata entry interface screens that allow the user to input metadata to be associated with a scanned document. The metadata entry interface screens may allow a user to enter an assortment of metadata which includes, but is not limited to, category, type, location, purpose, numerical identifiers, etc. In addition, the metadata interface 101*a* allows the creation of a dynamic workflow path. This is facilitated by first prompting the user to enter metadata from a selection or list located in the first metadata entry interface screen. Afterwards, the user is presented with a second metadata entry interface screen, the content of which is dependent on the metadata entered in the first metadata entry interface screen. Likewise, the third and subsequent first metadata entry interface screens have content that depend on the metadata entered previously on the immediate preceding metadata entry interface screen.

The metadata capture part 101*b* obtains the metadata that the user has entered on the metadata interface 101*a*. Whenever the user performs a selection on the metadata entry interface screens of the metadata interface 101*a*, the metadata capture part 101*b* captures the metadata information entered by the user and may store it in the storage of the MFP 101.

The metadata workflow control part 101*c* uses the captured metadata obtained from the metadata capture part 101*b* to customize the metadata entry interface screens. This is facilitated by first by receiving confirmation from the user that the workflow entered on the series of one or more metadata entry interface screens on the metadata interface 101*a* is finished. Then, the user is promoted to save the workflow (i.e. the list of metadata entered by the user) on to the MFP 101. In the case that the user wishes to save the workflow, the metadata workflow control part 101*c* registers the workflow as a customized workflow for the user. The next time the user wishes to perform a scan job, he or she may use the saved customized workflow to add metadata to the file of the output document from the scan job.

Figure 2:
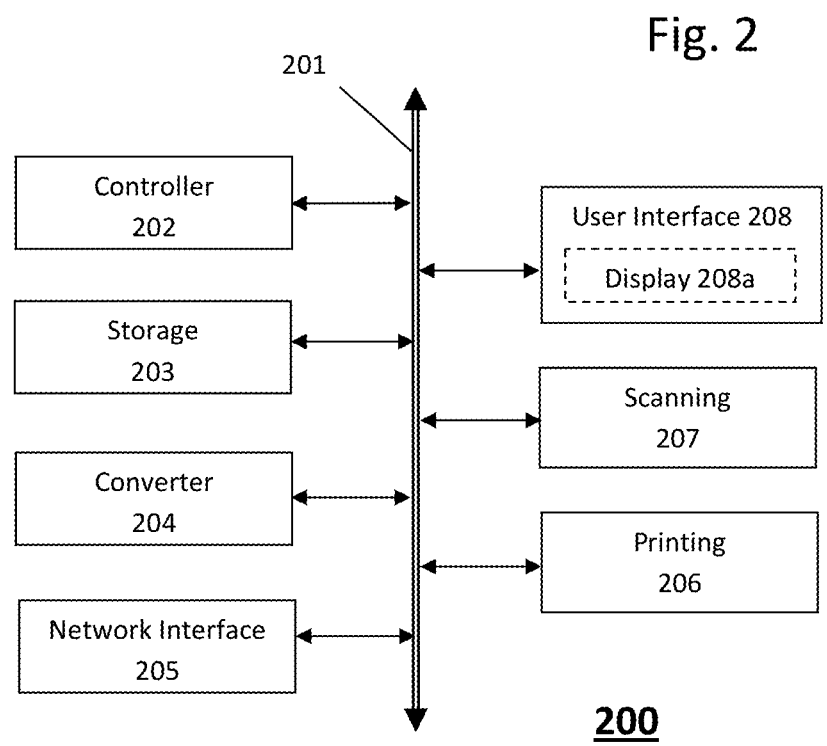
FIG. 2 shows a block diagram of an exemplary configuration of a multi-function device.

FIG. 2 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities. The MFP 200 shown in FIG. 2 includes a controller 202, and various elements connected to the controller 202 by an internal bus 201. The controller 202 controls and monitors operations of the MFP 200. The elements connected to the controller 202 include storage 203 (for example, random access memory, read-only memory, hard disk drive, portable storage media drive such as for optical discs, magnetic discs, magneto optical discs, etc., semiconductor memory cards, combinations of storage media, etc.), a converter 204, a network interface (I/F) 205, printing 206, scanning 207 and a user interface 208.

Storage 203 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 202 to carry out the instructions. Such instructions can include instructions for performing specified functions (such as printing, scanning, faxing, copying, e-mailing, etc.) of the MFP 200, to enable the MFP 200 to interact with a terminal, as well as perhaps other external devices, through the network interface 205, and interactions with users through the user interface 208.

The network interface 205 is utilized by the MFP 200 to communicate with other network-connected devices such as a terminal, a server (e.g. the server 303 of FIG. 3B) and receive data requests, print jobs, user interfaces, and etc.

The user interface 208 includes one or more electronic visual displays that display, under control of controller 202, information allowing the user of the MFP 200 to interact with the MFP 200. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 200, so as to allow the operator to interact conveniently with services provided on the MFP 200, or with the MFP 200 serving as terminal for accessing electronic data or other content through the network. User interfaces or other contents received through the network via the network interface 205 can be displayed on the display screen.

The display screen does not need to be integral with, or embedded in, a housing of the MFD 200, but may simply be coupled to the MFD 200 by either a wire or a wireless connection. The user I/O 208 may include keys and/or buttons (such as graphical keys or buttons, or other graphical elements, of a GUI on a touchscreen display 208a) for inputting information or requesting various operations. Alternatively, the user I/O 208 and the display screen may be operated by a keyboard, a mouse, a remote control, voice recognition, or eye-movement tracking, or a combination thereof.

Since the MFD 200 is typically shared by a number of users, and is typically stationed in a common area, the MFD 200 preferably prompts the user to supply login credentials or authentication information, such as user name (or other user or group information), password, access code, etc. The user credentials can be compared to data stored in the user management table 206 to confirm that the user is authorized to use the MFD 200. The user credentials may also be stored for the session and automatically supplied if access to other devices through the network requires it. On the other hand, such other devices may prompt the user to supply other user credentials through the user interface.

Other methods of authentication may also be used. For example, the MFD 200 may be equipped with a card reader or one or more biometrics means (such as comparing fingerprints, palm prints, voice or speech, retinas or irises, facial expressions or features, signature, etc.).

The MFD 200 may communicate the user credentials, provided in the manners discussed above, to other devices or applications connected to the MFD 200 via a network (e.g., the network 305 of FIGS. 3A and 3B) for determining authorization for performing jobs.

Scanning 207, printing 206, and network interface 205 are otherwise conventional, and therefore, a detailed description of such conventional aspects is omitted in the interest of clarity and brevity. The MFP 200 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 3A:
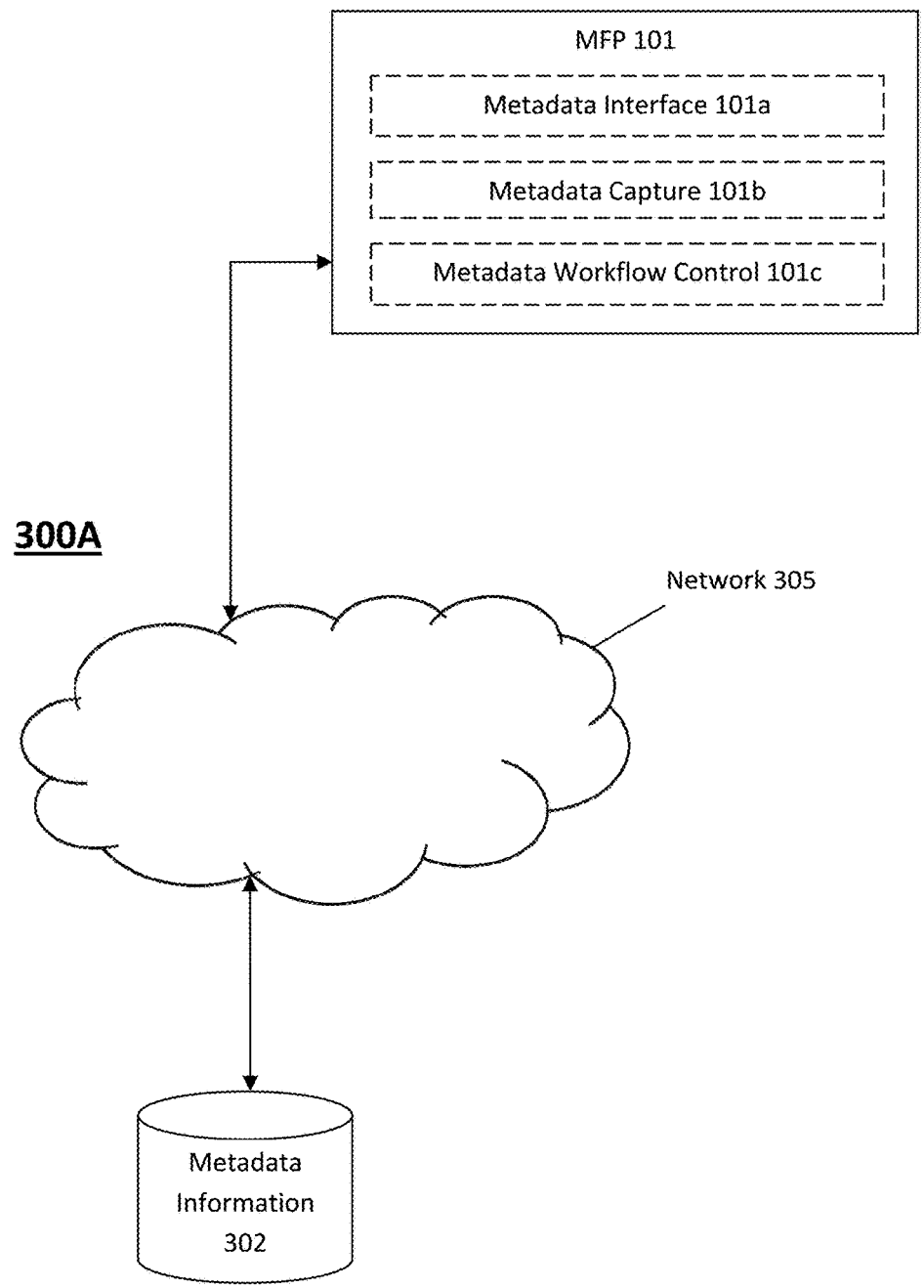
FIG. 3A shows a block diagram of a system for enhancing metadata registration workflow, according to another exemplary embodiment.

FIG. 3A shows schematically a system 300A that includes, all of which are interconnected by network 305, a multi-functional printer (MFP) 101 and a metadata information database 302.

The metadata information database 302 is a database that stores metadata information. When a user creates a workflow he or she selects different metadata to be associated with the file containing the document he or she is going to scan. For example, the user may be prompted by the MFP 111 to select metadata such as a country from a list or a project name. The number of countries and project names may not necessarily take up a large amount of space, individually. However, the number of different types of metadata may cause a significant amount of storage space to be taken up. It is also possible that the number of different types of metadata may increase to the point where the MFP 101 cannot store them. Thus, the metadata may be stored in a database such as the metadata information database 302 instead. The MFP 101 may connect with the metadata information database 302 anytime to obtain the metadata to be shown to the user.

The network 305 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 305. In addition, the network 305 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 3B:
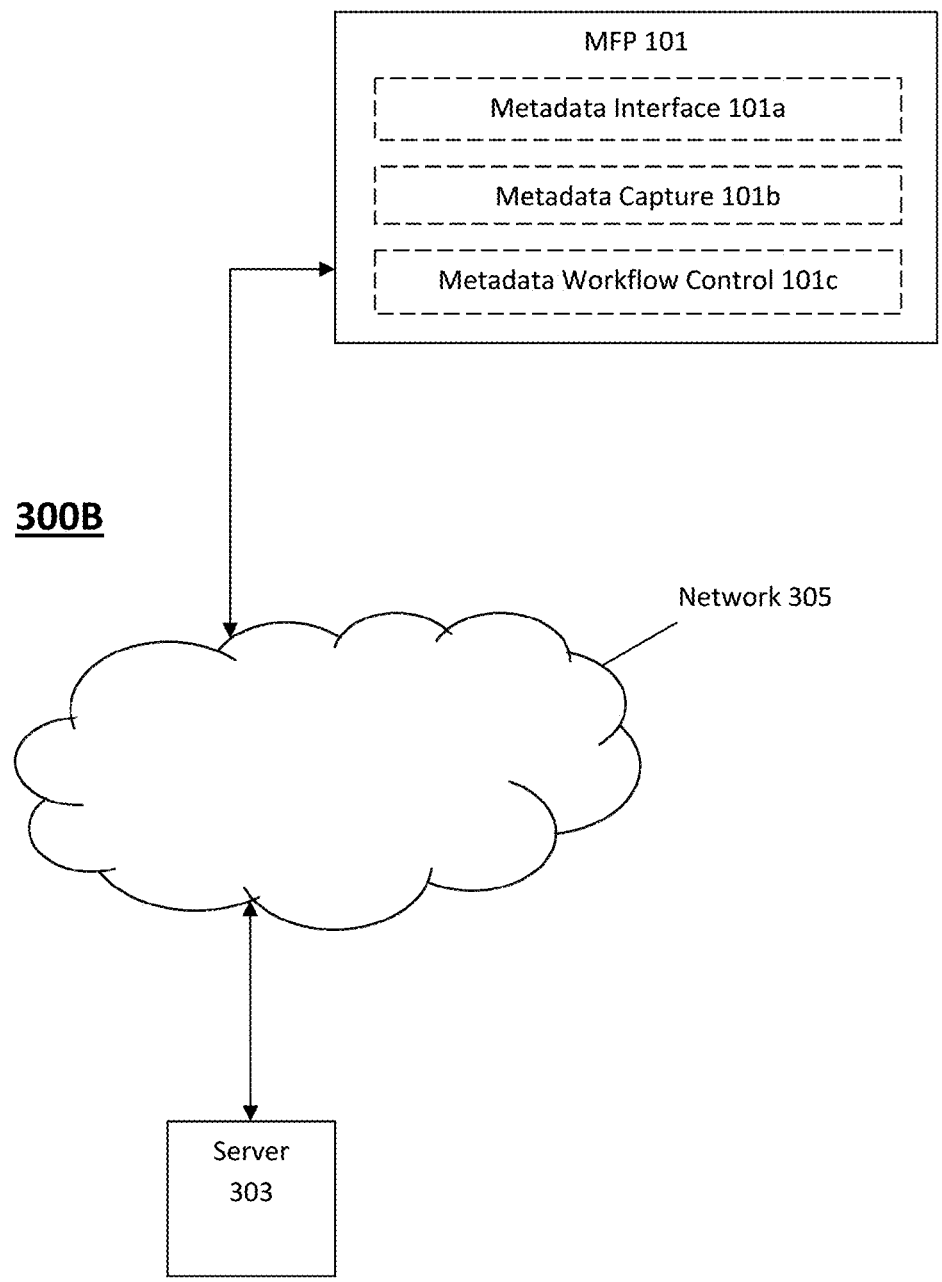
FIG. 3B shows a block diagram of a system for enhancing metadata registration workflow, according to another exemplary embodiment.

FIG. 3B shows schematically a system 300B, according to another exemplary embodiment. The system 300B is similar to the system 300A of FIG. 3A except that the system additionally includes a server 303.

The server 303 is connected to network 305, and stores software that is used for configuring functions on the MFP 101. In this case, the MFP 101 may not have any preinstalled software and must download such software from another location (e.g. the server 303) in order to perform functions such as providing the user with the option of adding metadata to files resulting from scanning sheets or documents. For example, the feature of adding metadata may not be available to all users. The software may not be on the MFP 101 for various reasons (i.e. save storage space, prevent unauthorized security access to certain MFP 101 features, etc.). Thus, in case in which a user who is authorized to access this particular feature on the MFP 101, the server 303 sends the software for adding metadata to the MFP 101. However, before sending the software the server 303 checks the user credentials of the user (S500 in FIG. 5A). This is obtained when the user inputs a username and password in to the MFP 101 to access its features. If the user has authorization to access the features of adding metadata, the server 303 sends the software to the MFP 101. Otherwise, the software is not sent. The server 303 is further described infra with reference to FIG. 4.

Figure 4:
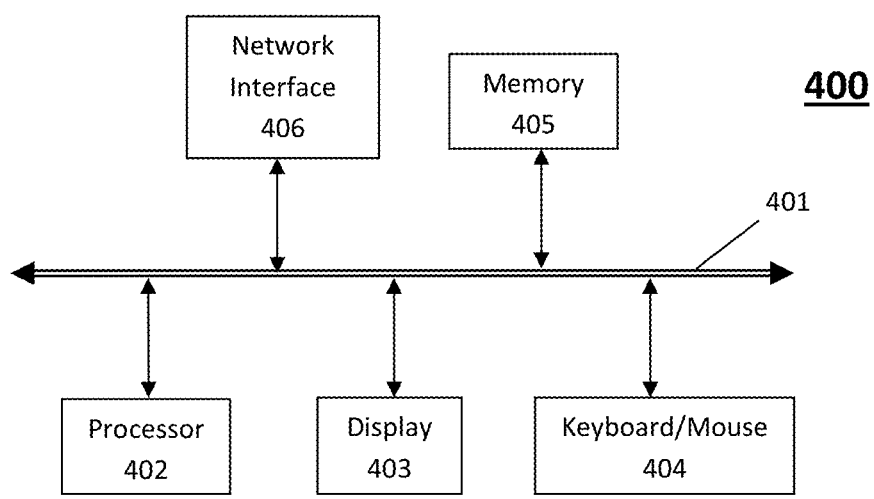
FIG. 4 shows a block diagram of an exemplary configuration of a computing device that can be configured to operate as a server or another service providing device.

Otherwise, operations of the elements of the system 300B are similar to those discussed in connection with the corresponding elements of the system 300A of FIG. 3A. FIG. 4 shows an exemplary constitution of a computer 400 that can be configured (for example, through software) to operate (at least in part) as the server 303 of FIG. 3B. As shown in FIG.

4, the management unit 400 includes a controller (or central processing unit) 402 that communicates with a number of other components, including display 403, keyboard/mouse 404, memory or storage part 405 and network interface 406, by way of a system bus 401. The computing device 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
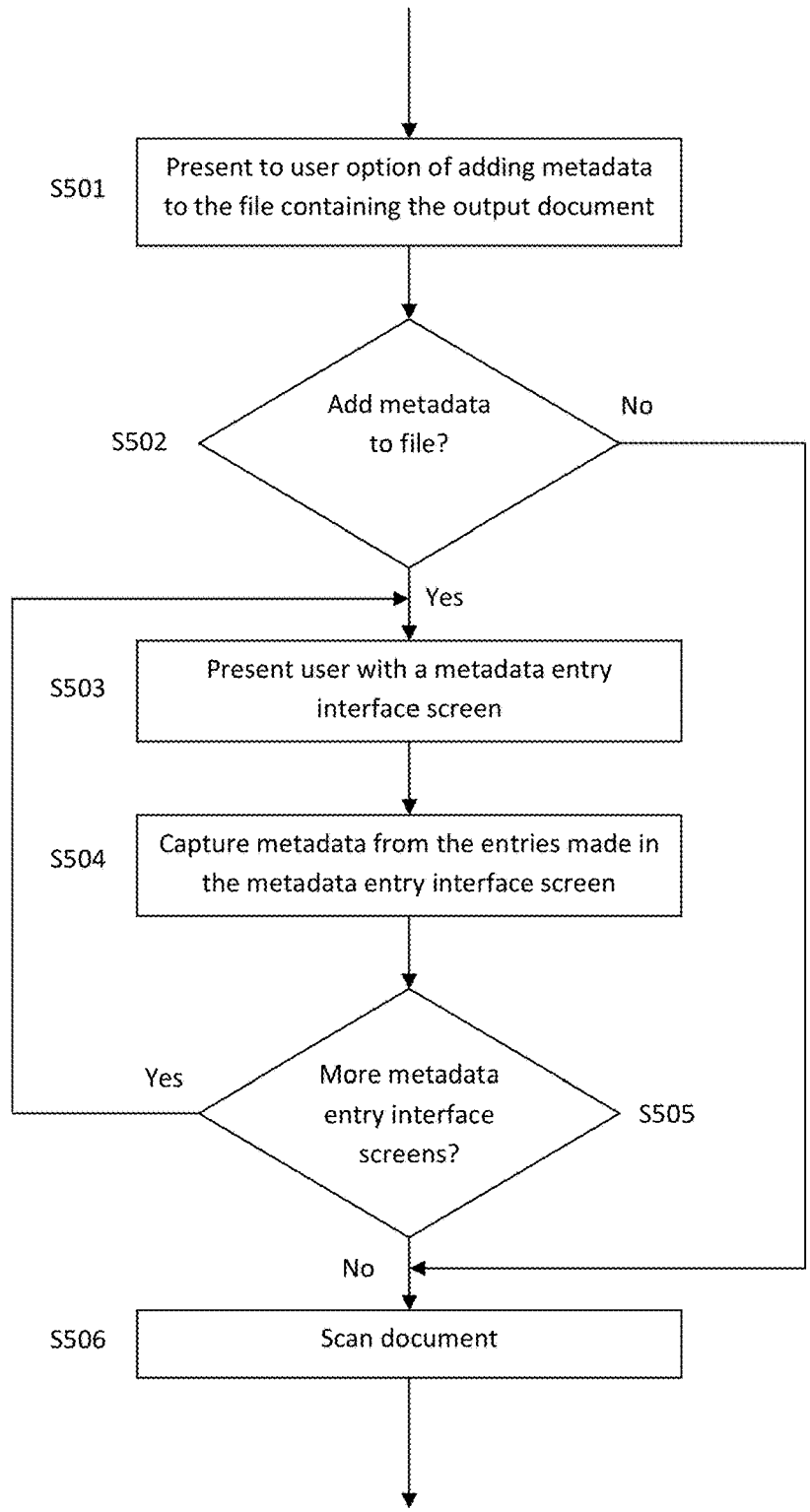
FIG. 5 shows a flow chart of a method for enhancing metadata registration workflow, according to an exemplary embodiment.
Figure 5A:
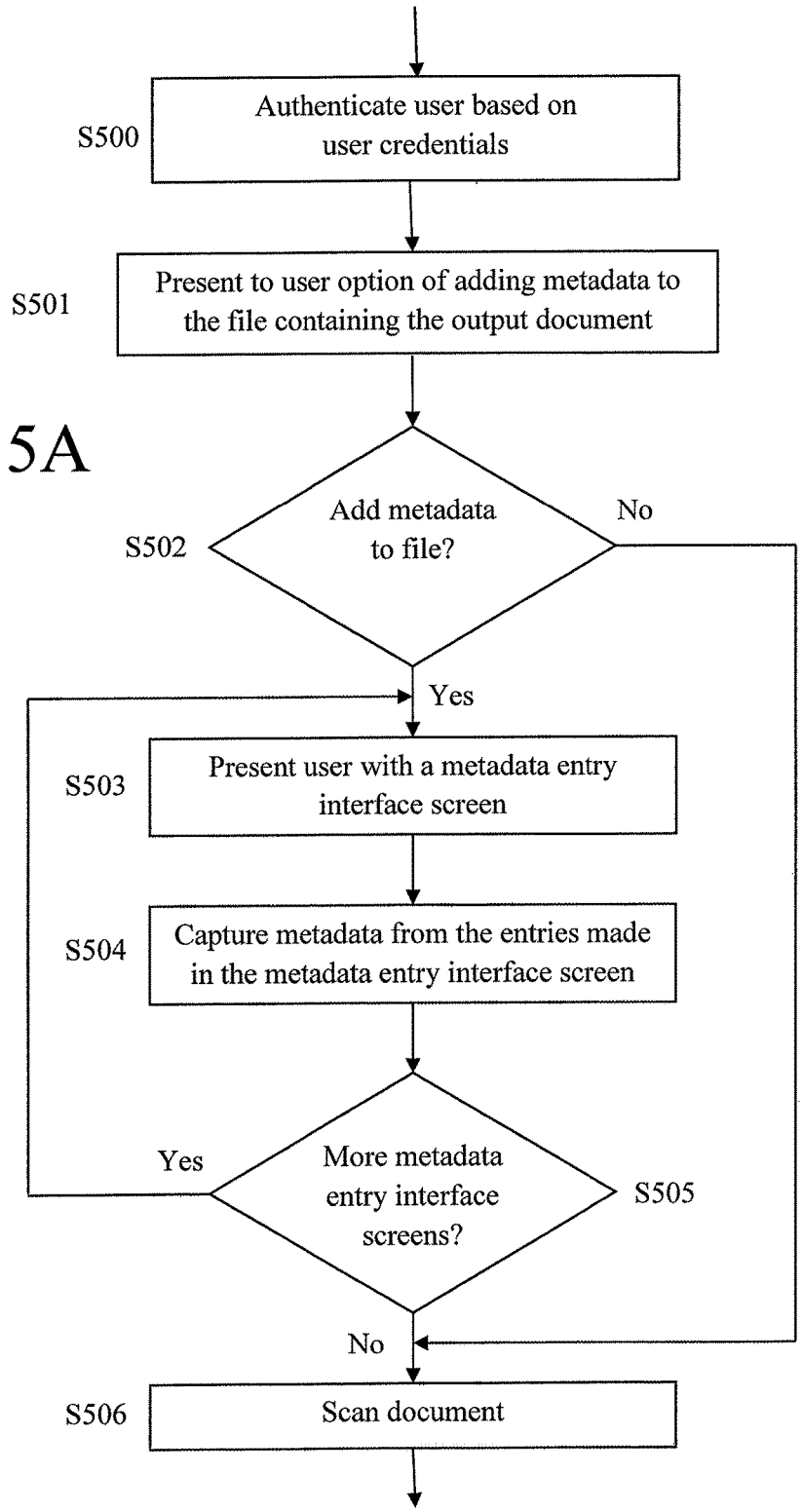
FIG. 5A shows a flow chart of a method for enhancing metadata registration workflow, according to another exemplary embodiment.

FIG. 5 shows a process performed by an MFP (e.g., 101), for adding metadata to a file containing the output document, according to an exemplary embodiment.

The MFP 101 allows users to create metadata which is to be associated with a file containing a document that the user has scanned using the MFP 101. The metadata is typically defined as "data about data". In other words, it may be a description of a file and may be located within the file itself. For example, a metadata of a file named "Engineer.pdf" could have information relating to the file size, the number of pages, the time the file was created, the last time the file was updated, author the file, standards used to create the file, etc. on the file itself. Thus, the metadata allows users to quickly view pertinent information associated with a file.

The user may have the option of creating a selection of one or more metadata when he or she is performing a scan job at a scanner or an MFP. After the scanner or MFP has scanned the documents, the user may have the option of adding metadata to the file that contains the scanned documents. In the case that the user requests to add metadata to the file, the MFP presents the user different metadata for the user to select from. This selection of one or more metadata is called a workflow. Each workflow can be different for every user. For example, the selection of metadata in the workflow for a user whose role is an engineer may not be the same as the selection of metadata for a user whose role is a secretary. Thus, it can be said that workflows are customized by the MFP 101 for each particular user.

Figure 6A:
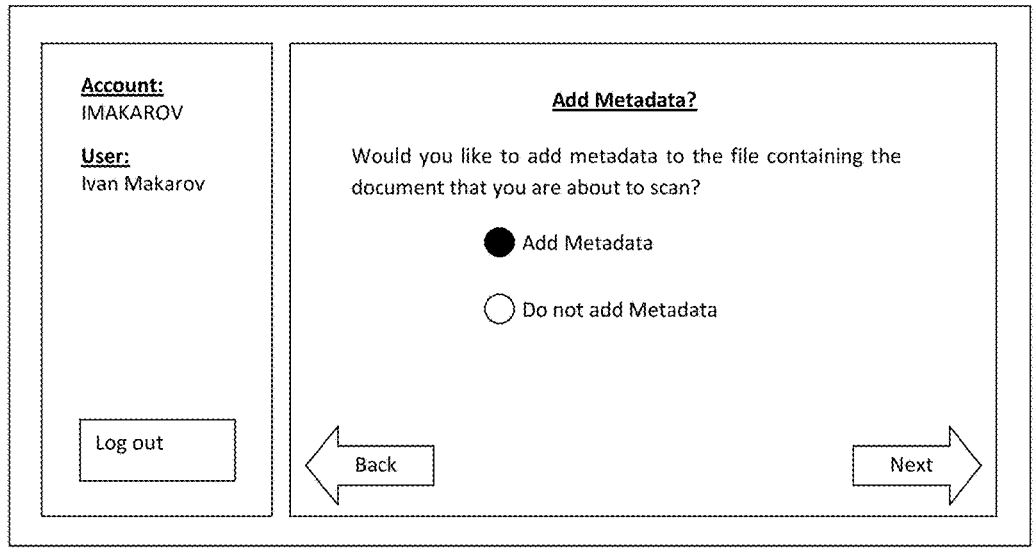
FIGS. 6A-6Q show examples of user interface display screens displayed on an apparatus having scanning functionality, according to an exemplary embodiment.

The user can facilitate the creation of a customized workflow when he or she is performing any type of scan job on the MFP 101. It should be noted that the user may be presented with the option to create a customized workflow before any scanning is performed. The process for creating the metadata for the file begins when the user is presented with a screen asking if he or she wishes to add metadata to the file containing the output document of the scan job (step S501) as shown in FIG. 6A. In the case that the user has selected not to add the metadata to the file, the MFP 111 performs scanning on the sheets in either the ADF or the glass platen (step S502, no).

Figure 6B:
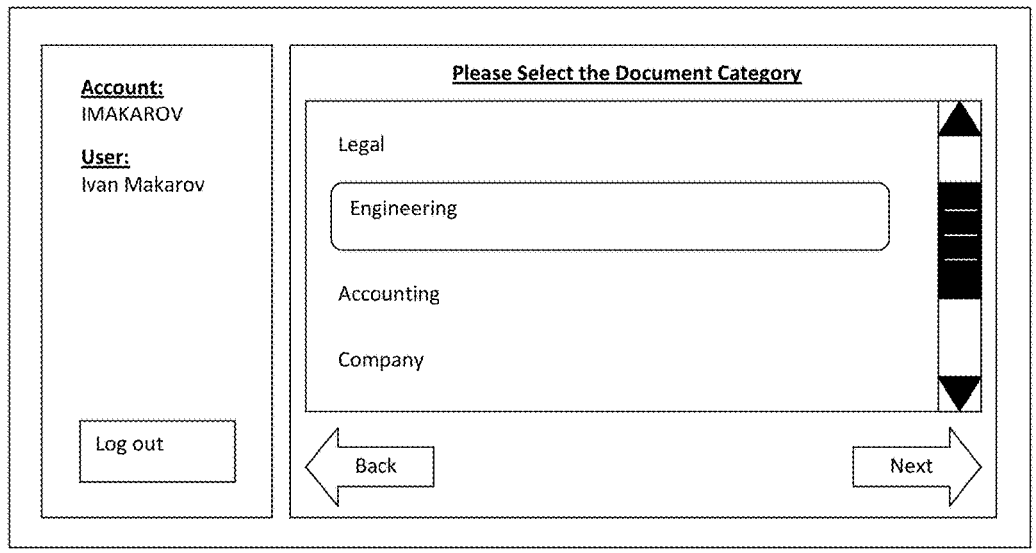

However, in the case the user has selected to add metadata to the file (step S502, yes), he or she is presented with a first metadata entry interface screen in a series of one or more metadata entry interface screens (step S503) as shown in FIG. 6B. Here, the user is prompted by the MFP 101 to select a category from several options which include "Legal", "Engineering", "Accounting" and "Human Resources". It should be noted that each metadata entry interface screen may contain a selection of metadata from which the user can select from or the metadata entry interface screen may prompt the user to input information instead. For this particular example, the user has selected "Engineering". After the user has performed the selection, the MFP 101 captures the metadata from the entry made by the user in the metadata entry interface screen (step S503). Then, the MFP 101 makes a determination to confirm if there are more metadata entry interface screens (step S1505). In the case that there are additional metadata entry interface screens (step S505, yes), the next metadata entry interface screen is presented to the user. Otherwise (step S505, no), the MFP 111 performs scanning on the sheets (step S506). It should be noted that the capturing of the metadata from the entries made by the user onto the metadata entry interface screen and the determination of whether there are any metadata entry interface screens left are performed every time after the user has made an entry onto the metadata entry interface screen.

Since in this case, there are more metadata entry interface screens left, the user is prompted by the MFP 101 again to perform a selection. This time, a second metadata entry interface screen is presented to the user with the contents including "References", "Projects", "Presentations", "Confidential Items", "Charts", "Manuals", "Research", "Equipment", "Lab Samples", "Prototypes", "Blueprints" and "Memos" as shown in FIG. 6C. It should be noted that the content for this particular second metadata entry interface screen is presented in columnar form. An internally designed algorithm may determine the most optimal fit based on data selection criteria.

As stated previously, the contents of the second metadata entry interface screen can depend on what was selected in the first metadata entry interface screen. Since, in this case, the user "Ivan" selected "Engineering" in the first metadata entry interface screen, the second metadata entry interface screen displays the content mentioned previously. On the other hand, in the case that the user "Ivan" selected "Legal", he may be shown an entirely different metadata entry interface screen. For example, the user "Ivan" may have been shown a metadata entry interface screen as shown in FIG. 6D when he selected "Legal". In this metadata entry interface screen, the user may be prompt to enter a "Client Number" which may comprise one or more numbers and/or symbols. In addition, there may also be a function to output error information to the user on this metadata entry interface screen. For example, the maximum number of numbers and/or symbols in the "Client Number" may be four. However, the user may input more numbers and/or symbols greater than four. As such, the MFP 101 may output a message indicating this. It should be noted that the error message may be displayed to the user just as he or she is inputting the numbers or symbols. Further, in the case that there is still an error, the user may not advance to the next metadata entry interface screen by pressing the "Next" button. This is true for the subsequent third metadata entry interface screen as well.

Figure 6E:
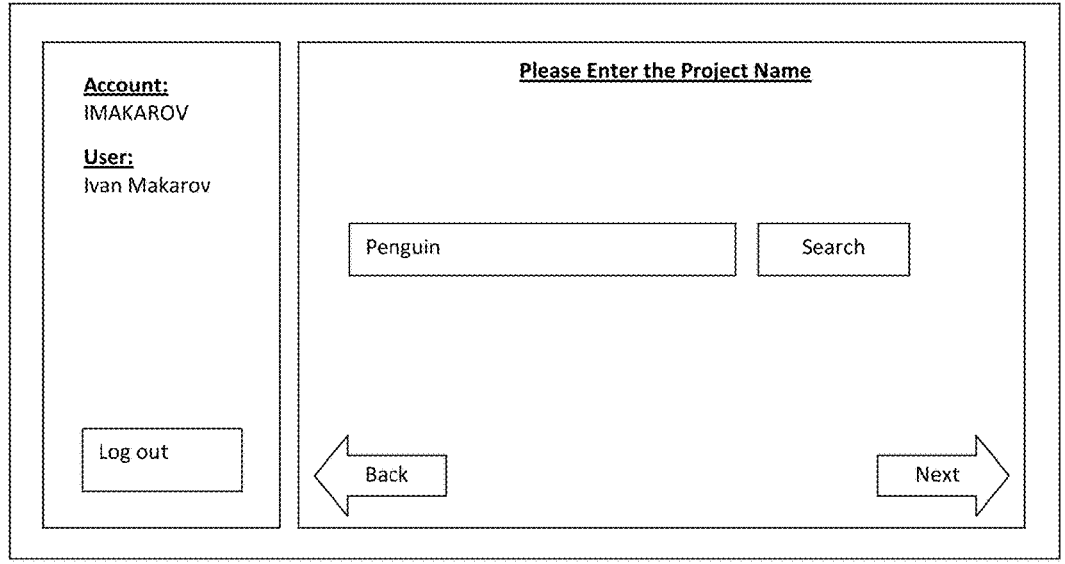
Figure 6F:
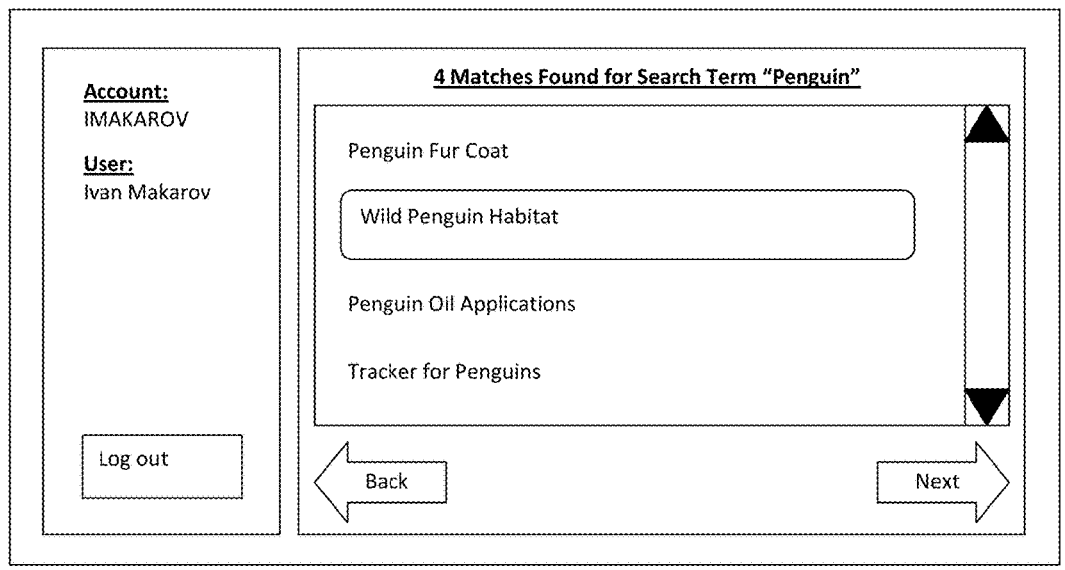
Figure 6G:
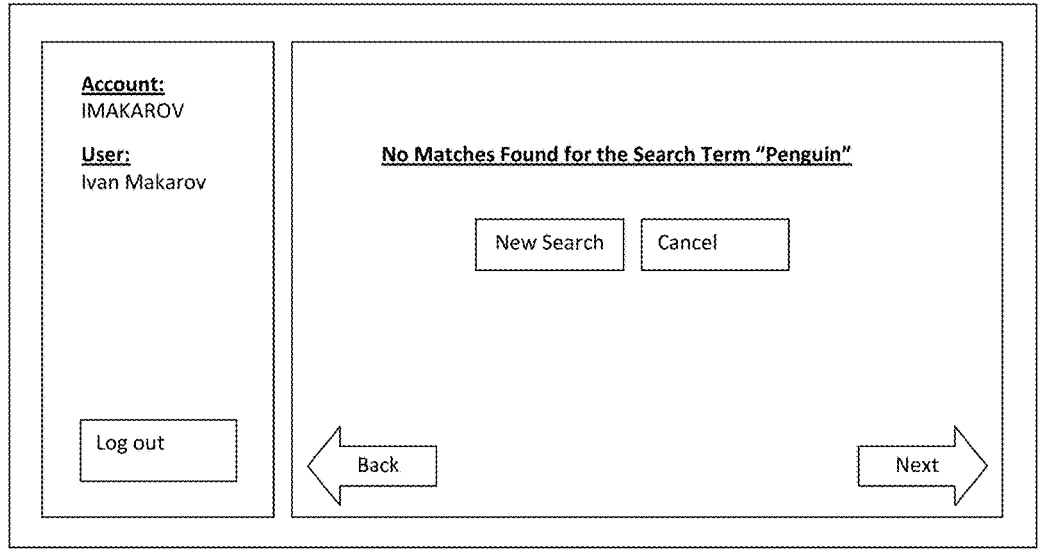

In the third metadata entry interface screen, the user is prompted by the MFP 101 to perform a search for the project name as illustrated in FIG. 6E. In this case, the user may provide characters on to a search box and press the "Search" button to perform a search for project names containing those characters. After the MPF 101 has finished performing the search, a list of matches is presented to the user as illustrated in FIG. 6F. For the search characters "Penguin", the user is presented with, in this case four project names which contain those characters. As shown, the matches are "Penguin Fur Coat", "Wild Penguin Habitat", "Penguin Oil Applications" and "Tracker for Penguins". In this case the user has selected "Wild Penguin Habitat" as the project name. It should also be noted that the MFP 101 may not come up with any search results as shown in FIG. 6G. After the user has made the selection, he or she may press the "Next" button to proceed to the fourth metadata entry interface screen. Thus, it should be noted that the MFP 101 does not only present to users with pre-set selections as shown previously, but can also allow users to perform searches.

Figure 6H:
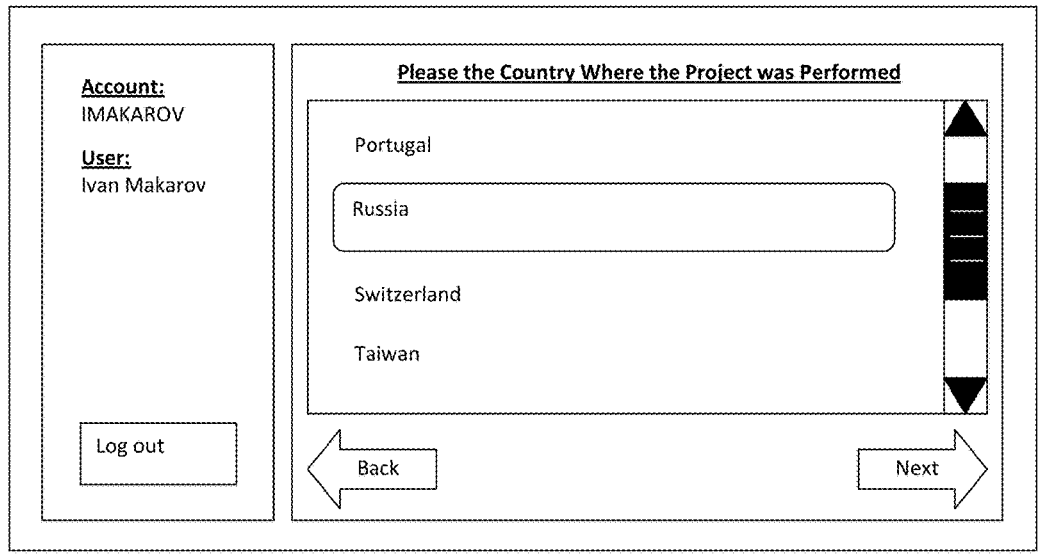

As shown in FIG. 6H, the user is prompted, in a fourth metadata entry interface screen, to select a country where the project took place. Consequently, the user is shown a pre-canned list containing a list of countries. A partial list of the countries shown includes "Portugal", "Russia", "Switzerland" and "Taiwan". In this case, the user "Ivan" selects the country of "Russia" from the list.

It should be noted that the information provided by the MFP 101 in the metadata entry interface screens (i.e. search results, country list, etc.) may not necessarily be stored in the MFP 101. Instead, the MFP 101 may access an external database in order to obtain the information for presenting to the user. This allows the MFP 101 to efficient use its storage space by not having to store the volumes of information that make up the metadata.

Next, after the user has performed all of the selections for the metadata, he or she is shown a pre-scan summary screen as shown in FIG. 6I. The pre-scan summary screen shows the user a list of the entries that the user had previously entered on the metadata entry interface screens. The pre-scan summary screen can be provided so that the user may review each entry he or she has made in order to confirm his or her selections. After the user has finished reviewing the selections he or she has made, the user can press the "Scan" button to begin scanning.

After the scanning has been performed, the user is shown a post-scan summary screen as shown in FIG. 6J. The post-scan summary screen is similar to the pre-scan summary screen in that it shows the user the list of entries that the user had previously entered on the metadata entry interface screens. Similar to the pre-scan summary screen, the post-scan summary screen allows the user may review each entry he or she has made before sending the file containing the output document and metadata to its intended destination. Further, the post-scan summary screen also allows the user to register the set of metadata previously entered into a workflow. In this case, the user "Ivan" selects to register the set of metadata that he previously entered in the first, second, third and fourth metadata entry interface screens by pressing the "Save Workflow" button.

Next, the MFP 111 requests the user to enter a name for the workflow as shown in FIG. 6K. In this case, the user "Ivan" has entered "Penguin Habitat". Afterwards, the user is presented with the option of selecting a workflow trigger part to be associated with the workflow as illustrated in FIG. 6L. The workflow trigger part provides the user with the option to immediately begin the workflow associated with that workflow trigger part. Further, the workflow trigger part may be in the form of a graphical icon that may be selected by the user. Thus, whenever the user wishes to perform a certain type of scan job utilizing a particular workflow after logging on the MFP 101, all the user has to do is select the workflow trigger part. This is advantageous in that the user does not have to reenter metadata or make redundant selections. He or she may simply select the workflow trigger part and begin the process. The workflow trigger part, in this case, is a set of graphical icons that include a "Send by E-mail" icon, a "Send by E-mail and to Folder" icon and a "Send to Folder" icon.

In the case that the user "Ivan" selects the "Send by E-mail" icon as the workflow trigger part, the scanned job process resulting from selecting this icon includes the "Penguin Habitat" workflow and the pre-selected option of sending the file containing the output document of the scanned job by e-mail. Likewise, in the case that the user selects the "Send to Folder" icon as the workflow trigger part the scanned job process resulting from selecting this icon includes the "Penguin Habitat" workflow and the pre-selected option of sending the file containing the output document of the scanned job to a folder. The "Send by E-mail and to Folder" workflow trigger part is a combination of the "Send by E-mail" workflow trigger part and "Send to Folder" workflow trigger part and offers both options to the user simultaneously. In addition, it should be noted that the user does not have to make a selection. He or she may select to not associate the workflow with any workflow trigger part as well. In this case, the user "Ivan" has selected not to associate the "Penguin Habitats" workflow with any workflow trigger part. After pressing the "Next" button, the user is presented again with the screen previously shown in FIG. 16J. Here, the user "Ivan" has decided to proceed with scanning a second set of documents by pressing the "Scan Add. Docs." button.

Figure 6M:
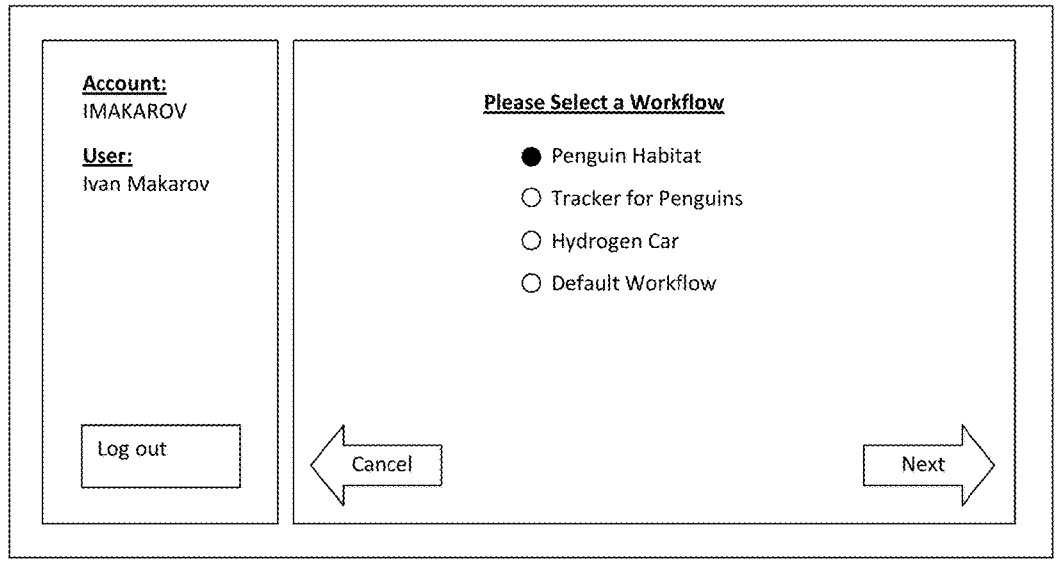

Next, when the user begins scanning the second set of documents, the MFP 101 presents him or her with a list of workflows that the user has previously created or that were pre-set by an administrator as shown in FIG. 6M. An example of the workflows that the user "Ivan" has previously created includes "Penguin Habitat", "Tracker for Penguin" and "Hydrogen Car". An example of a workflow pre-set by an administrator is "Default workflow" workflow. The "Default Workflow" workflow is the default workflow for users of the MFP 101.

Figure 6N:
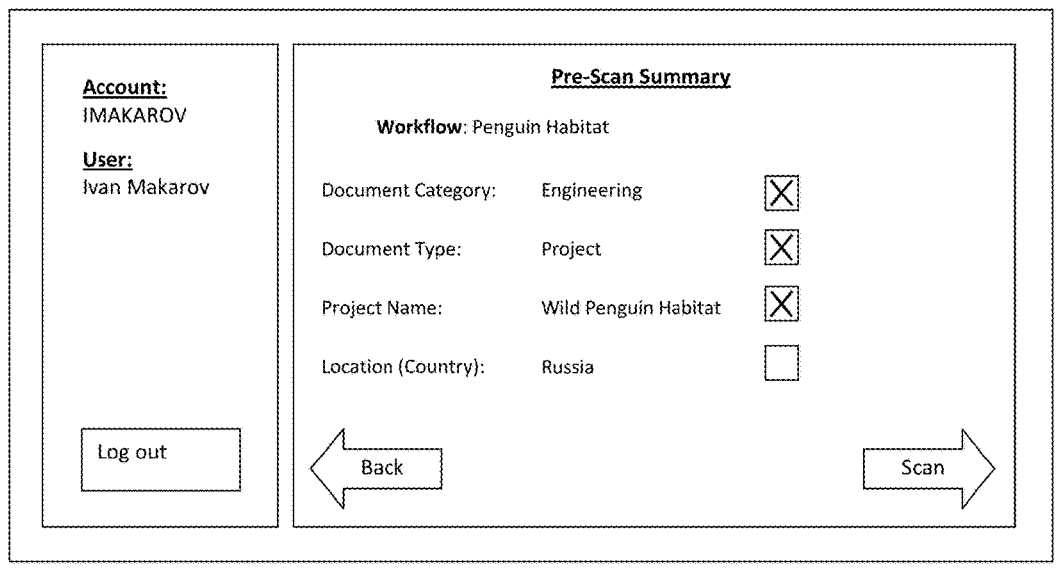

After performing the selection, the user is presented with a pre-scan summary screen as show in FIG. 6N. In this particular pre-scan summary screen, the user is provided with information such as the name of the workflow selected and the list of metadata associated with that workflow. Further, the user is also provided with the option of de-selecting each metadata. For example, the second set of documents that the user "Ivan" is scanning may describe the same project but in a different location such as Zimbabwe. Thus, to facilitate the change, the user "Ivan" may de-select the metadata for "Location (country)". Then, after pressing the "Next" button, the user "Ivan" is presented with the same metadata entry interface screen as shown previously in FIG. 6H. On this metadata entry interface screen the user "Ivan" may select "Ukraine" as the country. After performing the selection, the user "Ivan" is presented with the pre-scan summary screen again with the "Location (Country)" metadata being updated as "Ukraine". It should be noted that this procedure may be performed on the "Default Workflow" workflow as well.

Thus, the user may edit the contents of the workflow in the pre-scan summary screen. In the case that he or she de-selects one or more metadata, the user is required to replace that metadata with another metadata. This replacement process, performed through the MFP 101, is facilitated by presenting the user with the metadata entry interface screen corresponding to the metadata that was de-selected. This is significant in that the user is not required to edit the entire workflow from the first metadata entry interface screen to the last metadata entry interface screen. The user may simply edit only a portion of the workflow.

In an exemplary embodiment, in the case that "Ivan" did not create any workflows previously, he would be presented with the pre-scan summary screen showing the "Default Workflow" workflow as illustrated in FIG. 6O. The "Default Workflow" workflow may be different from other workflows in terms of what metadata it has. For example, the "Document Category" and "Document Type" are both different from the "Penguin Habitat" workflow. Further, the "Default Workflow" does not have metadata for "Client Number" or "Location (Country)". Instead, the "Default Workflow" workflow has metadata for "Report" and "Form", both of which are not in the "Penguin Habitat" workflow. Thus, the "Default Workflow" workflow is a default workflow that every user has access. Further, the metadata included in the default workflow may be different from the metadata included in other workflows. In addition, there may be more than one default workflow. The user "Ivan" may select any of these workflows and in this case he selects "Penguin Habitat".

Next, after making the necessary adjustments in the pre-scan summary screen, the user may proceed to scan to his or her sheets. After the scanning is finished, the user may be presented with a post-scan summary screen as shown in FIG. 6P. Similar to the pre-scan summary screen, the post-scan summary screen allows the user to review each entry he or she has made before sending the file containing the output document and metadata to its intended destination. Further, like the pre-scan summary screen, the user may de-select any metadata and replace it as well.

FIG. 6Q illustrates another example of a post-scan summary screen that may be displayed to the user. In this case the user may "Ivan" may have selected the "Default Workflow" workflow instead of "Penguin Habitat". Further "Ivan" may have de-selected "Report" in order to replace the current "General" metadata with another metadata. In this case, the user "Ivan" may have selected "Specific" metadata instead. Thus, while the "Default Workflow" workflow may be a default workflow, it is still possible for users to edit the "Default Workflow" workflow. However, should the user wish to use this setting (i.e. the edited "Default Workflow" workflow) in the future, he or she may not save it as a "Default Workflow" workflow, but have to rename it as another workflow.

Figure 7A:
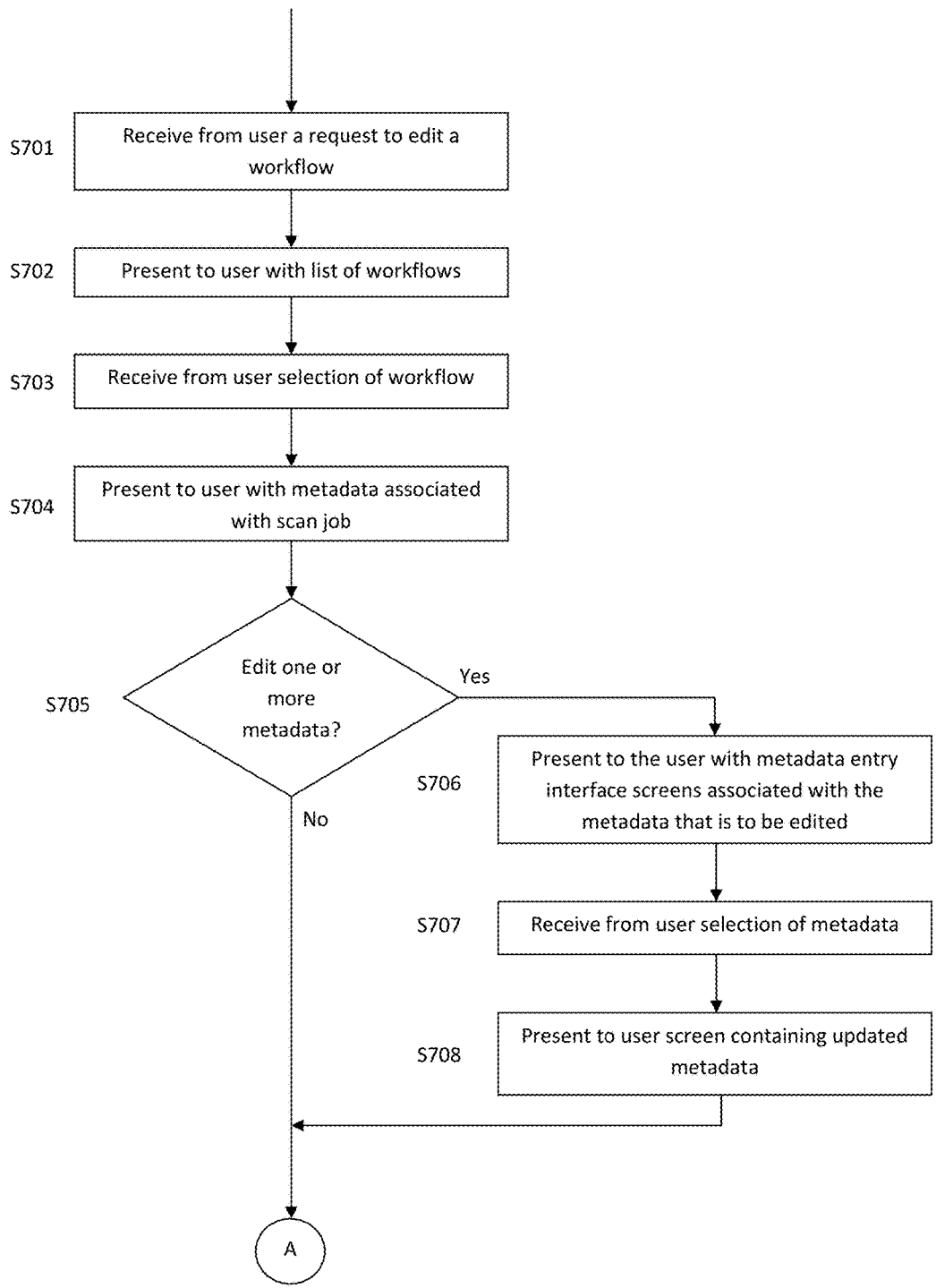
FIGS. 7A and 7B show a flow chart of a method for enhancing metadata registration workflow, according to an exemplary embodiment.
Figure 7B:
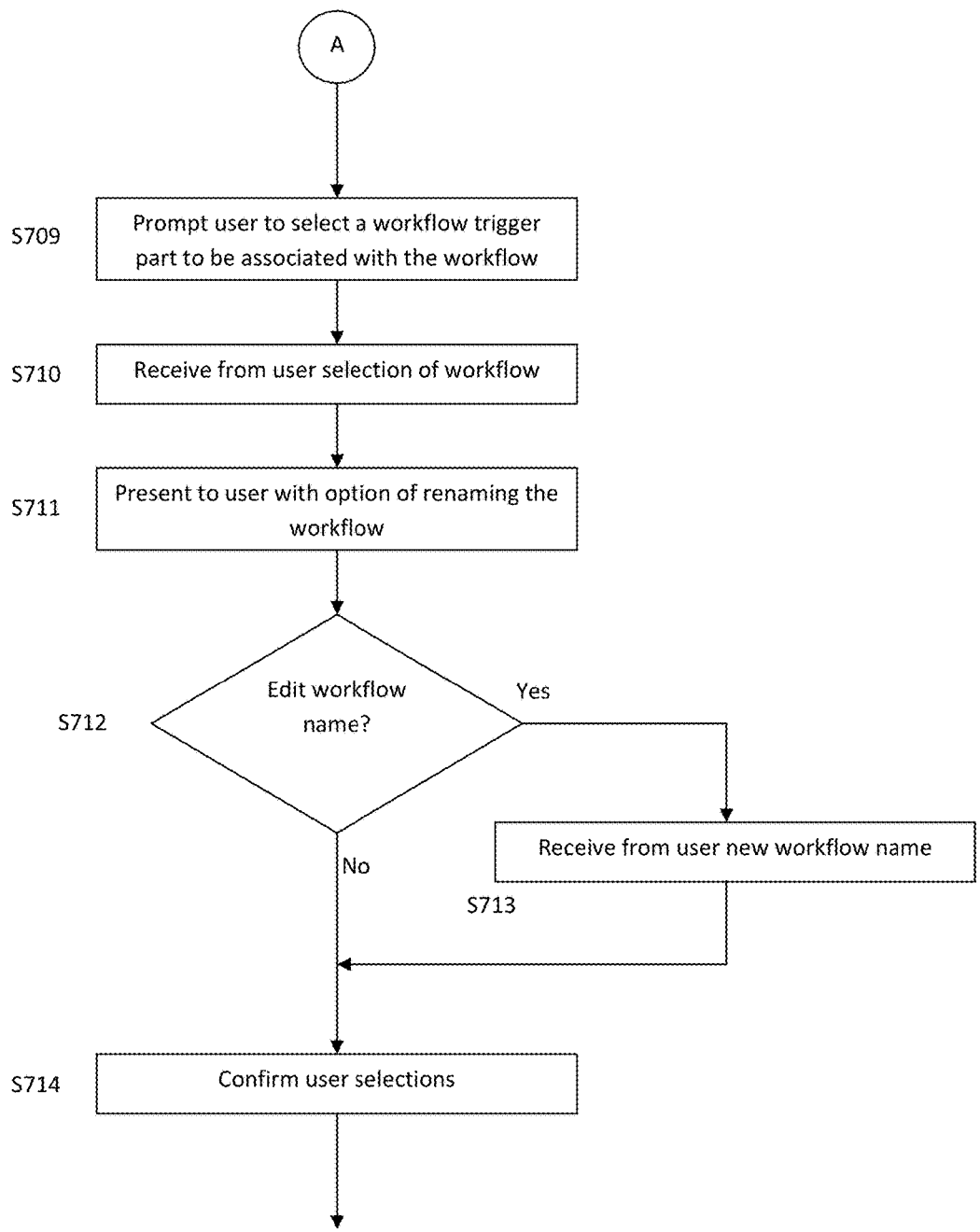

FIGS. 7A and 7B shows a process performed by an MFP (e.g., 101), for editing a workflow, according to an exemplary embodiment.

Figure 8A:
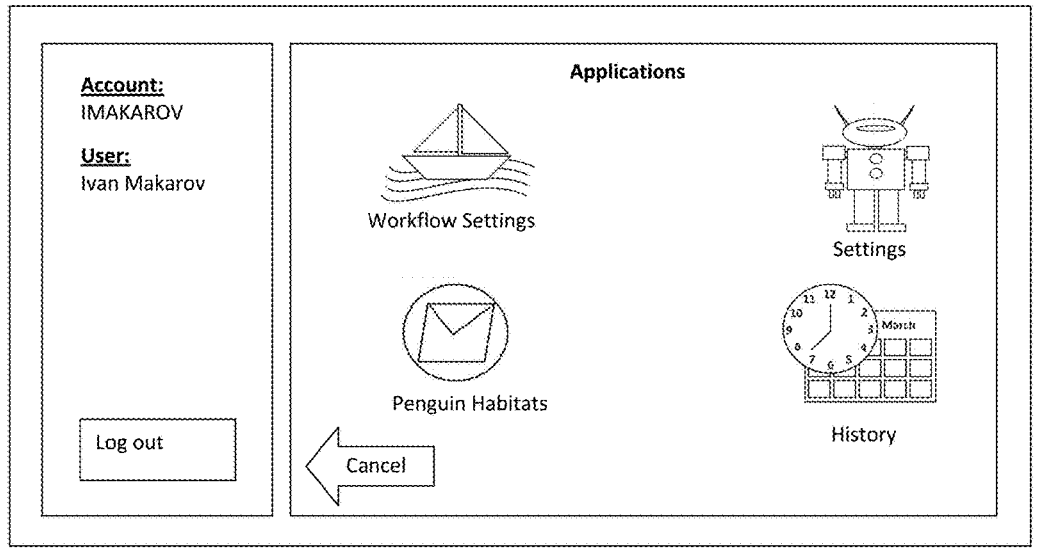
Figure 8B:
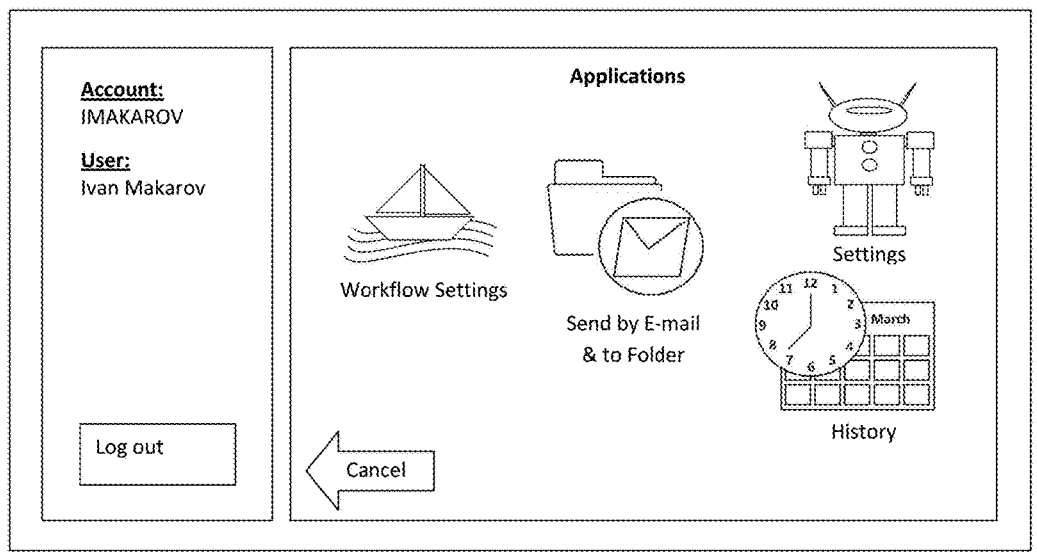

The user may access and make changes to previously created workflows in the "Applications" screen as shown in FIG. 8A. The "Applications" screen includes "Workflow Settings", "Penguin Habitats", "Settings" and "History". The "Workflow Settings" icon allows the user to create new workflows, edit previously made workflows and review all workflows. The "Penguin Habitats" icon is the workflow trigger part for starting a workflow previously created. The "Settings" icon allows the user to set the configurations of the MPF 101. The "History" icon allows the user to view the various actions performed previously on the MFP 101. It should be noted that, in an exemplary embodiment, the workflow trigger parts such as the "Penguin Habitats" icon is not required to be labeled specifically. It may have a more generic name such as "Send by E-mail and to Folder" instead as shown in FIG. 8B.

Figure 8C:
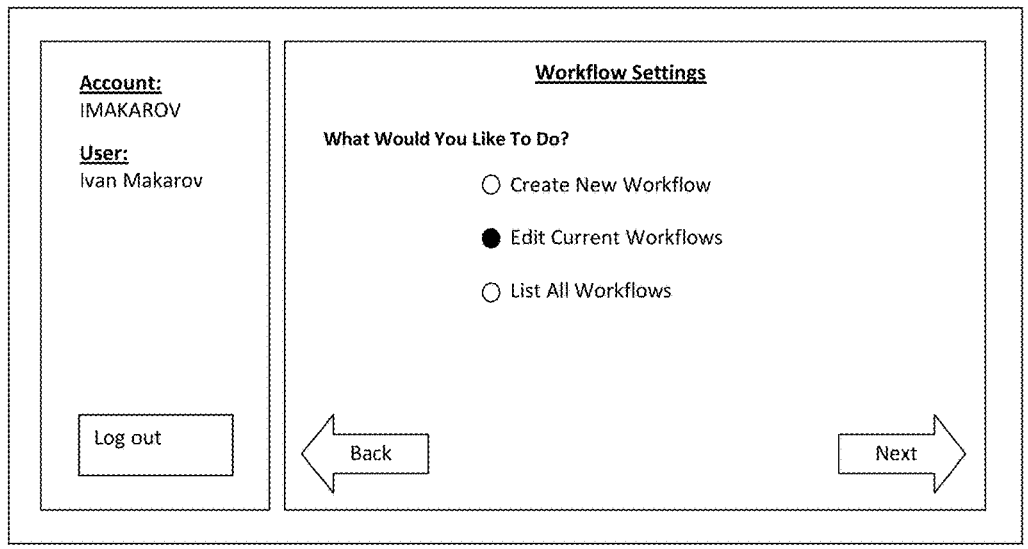

In the case that the user wishes to edit previous workflows, he or she begins by pressing the "Workflow Settings" icon on the "Applications" screen. Next, the user is prompted by the MFP 101 to select from several options as shown in FIG. 8C. This includes "Create New Workflow", "Edit Current Workflows" and "List All Workflows". The "Create New Workflow" option allows the user to make a new workflow. The "Edit Current Workflows" option allows the user to make changes to previous workflows. The "List All Workflows" option allows the user to view all workflows which may include the workflows previously created by the user or any workflows pre-set by an administrator. In this case, the user "Ivan" selects the option "Edit Current Workflows" option (step S701).

Figure 8D:
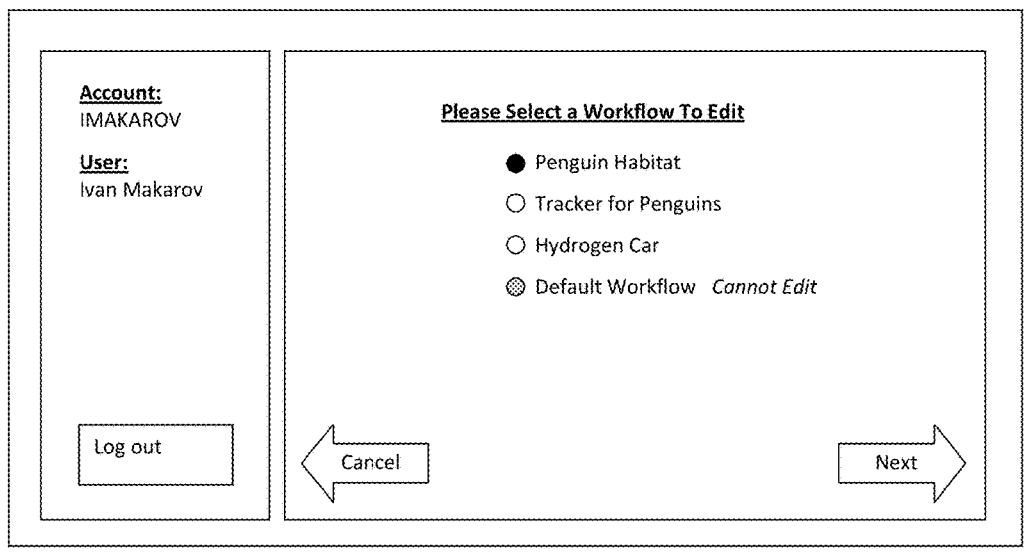

Then, the user is presented with a screen listing the workflows that he or she has along with the workflows pre-set by the administrator as shown in FIG. 8D (step S702). These include a "Penguin Habitat" workflow, "Tracker for Penguins" workflow, "Hydrogen Car" workflow and a "Default Workflow" workflow. It should be noted that as the "Default Workflow" workflow was created by the administrator, the user may not have the authorization to edit the workflow. However, this does not mean that the user never has the option of editing the "Default Workflow" workflow. During a scan job, the user may make edits to the "Default Workflow" workflow and have a different set of metadata. The difference is that the user may not be able to save the edited "Default Workflow" workflow as a "Default Workflow" workflow. He or she may be required to name it something else.

Figures 8E, 8F:
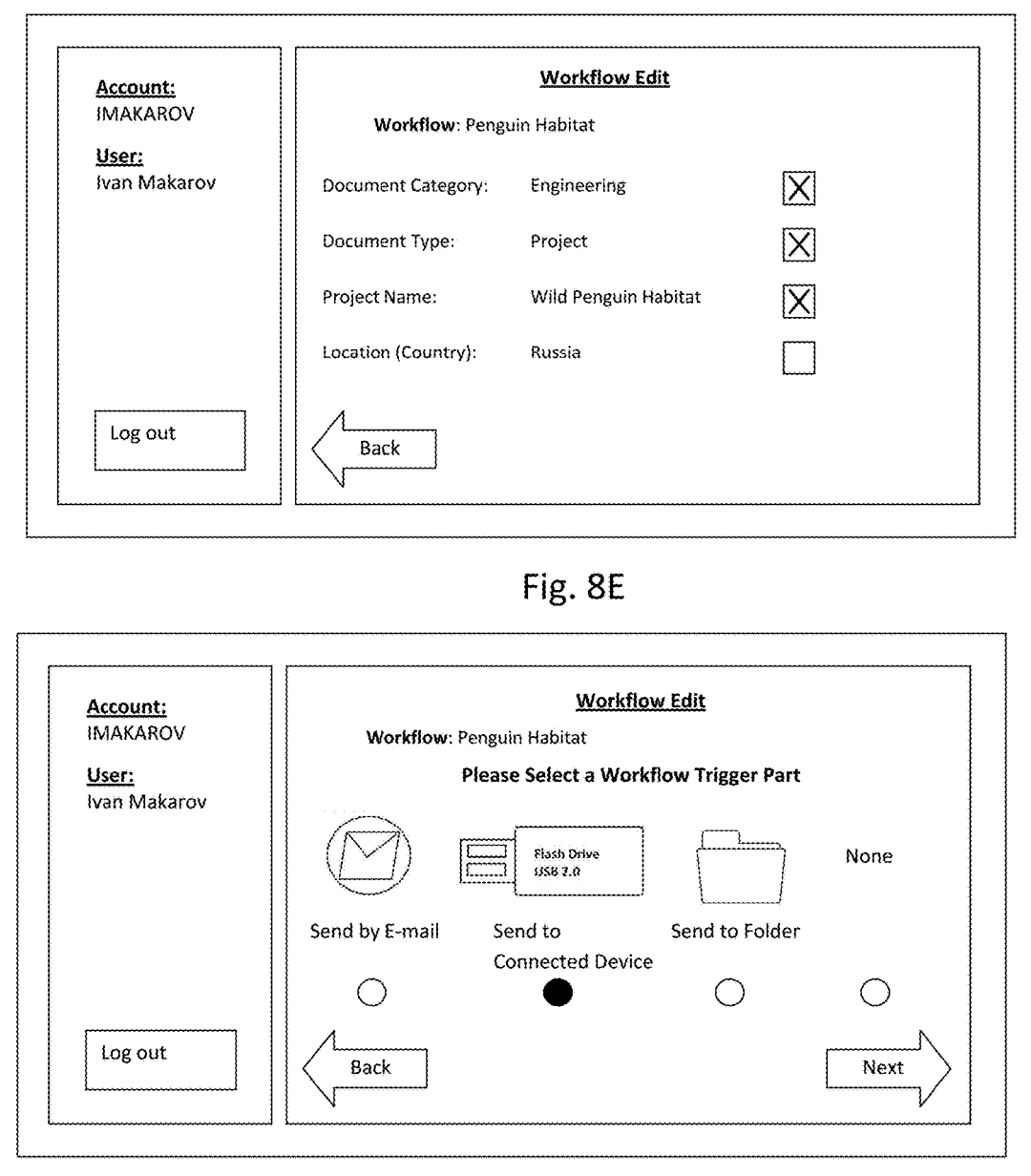

In this case, the user "Ivan" has selected to edit the "Penguin Habitat" workflow (step S703). After doing so, he is presented with a screen for editing the metadata in that workflow (step S704) as shown in FIG. 8E. Similar to what was discussed previously, the user "Ivan" can perform editing on the metadata associated with this workflow. In the case that he selects to edit the metadata (step S705, yes), he may facilitate this task by de-selecting the metadata that he wishes to change, which in this case is the "Client Number" metadata. Next, the MFP 111 presents to the user "Ivan" the metadata entry interface screens associated with the "Client Number" metadata (step S706). After receiving the metadata (step S707), the MFP 111 presents the user with a screen containing the updated workflow (step S708).

In the case that "Ivan" has selected not to edit the metadata (step S705, no) or he is finished with making the changes to the metadata, the MFP 111 prompts "Ivan" to select a workflow trigger part to be associated with the "Penguin Habitat" workflow (step S709) as shown in FIG. 8F. In this case, he is given three choices to select from which are a "Send by E-mail" trigger part, a "Send to Folder" trigger part and a "Send to Connected Device" trigger part. It should be noted in the case that the user associates a workflow trigger part with a workflow the workflow trigger part appears as an icon on the "Applications" screen as shown previously in FIGS. 8A and 8B. If the user selects that workflow trigger part, the resulting scan job process may include presenting to the user with the workflow associated with the workflow trigger part and also automatically presenting to the user, the function of that workflow trigger part.

For example, the user may select the "Send to Connected Device" trigger part to be associated with the "Penguin Habitat" workflow. In this case, when the user selects the "Send to Connected Device" icon on the "Applications" screen, he or she is presented by the MFP 101 with workflow for "Penguin Habitat". Next, the MFP 101 presents to the user the list of devices (i.e. flash drive, portable hard drive, etc.) currently connected to the MFP 101 for his or her selection. Thus, the MFP 101 does not offer the choice of sending by e-mail or to a folder since the workflow trigger part is meant to be used for sending to a connected device. Consequently, by associating a workflow trigger part with a workflow, it makes the process for scanning much quicker. However, as state previously, the user is not required to select a workflow trigger part.

Figure 8G:
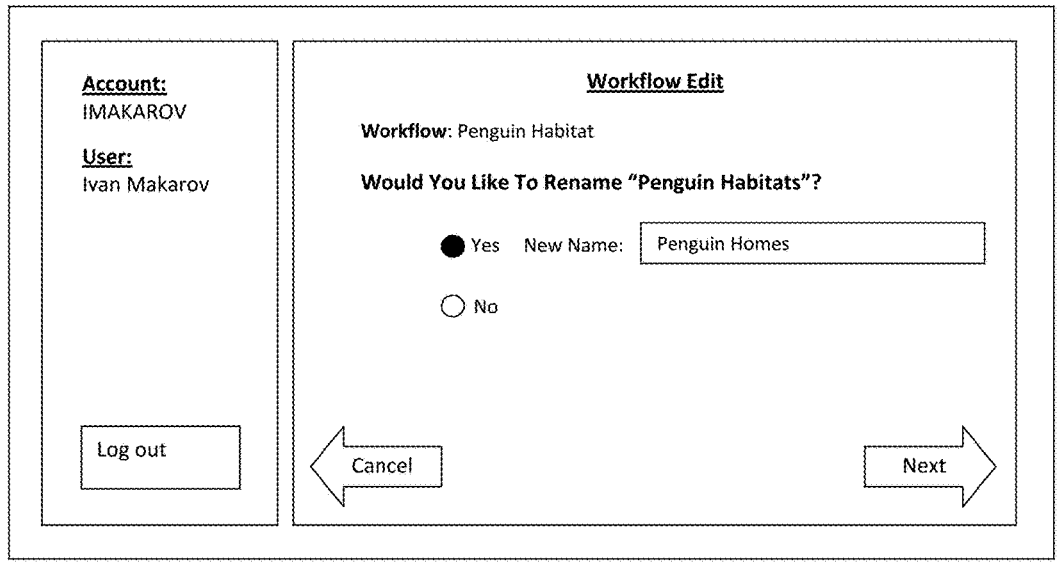
Figure 8H:
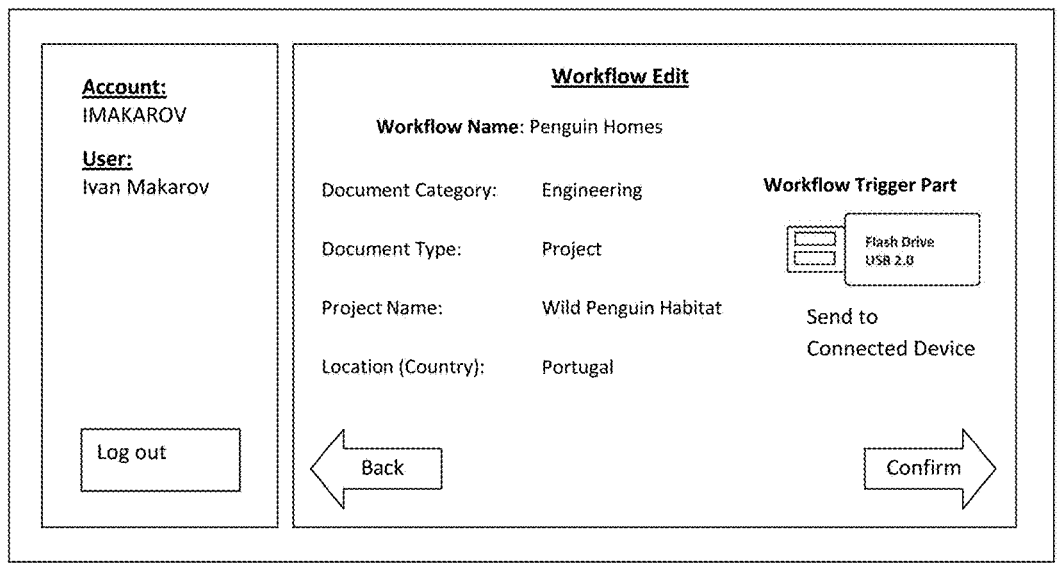

After the user selects the "Send to Connected Device" trigger part to be associated with the "Penguin Habitat" workflow (step S710), the MFP 101 presents to him or her with the option of editing the name of the workflow (step S711) as shown in FIG. 8G. In the case that the user "Ivan" edits the name of the workflow (step S712, yes), he selects "Yes" radio button and types in the new name into the box which is received by the MFP 101 (step S713). In the case that the user has selected not to edit the metadata (step S712, no) or the user is finished with renaming the workflow, the MFP 101 presents to the user with a screen to confirm the changes that he or she has made (step S714) as shown in FIG. 8H.

It should be noted that all of these tasks (i.e. scanning, combining, renaming, sending, etc.) can be performed on the MFP 101 without interaction from any external device.

The orders in which the steps are performed in the aforementioned methods are not limited to those shown in the examples of FIGS. 5 and 7A-7B, and may be switched as long as similar results are achieved. Also, it should be noted that the methods illustrated in the examples of FIGS. 5 and 7A-7B may be implemented using any of the systems described in connection with FIGS. 3A-3B.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A multi-function output apparatus comprising an operational display, a document scanner to scan a document in a scanning session of an authenticated apparatus user, a processor and a non-transitory medium embodying a program of instructions executable by the processor to configure said multi-function output apparatus having the document scanner to perform a method comprising:
    (a) providing, on the operational display, of the multi-function output apparatus having the document scanner and via a metadata interface, a series of plural metadata entry screens, associated with a selected workflow, for user entry of metadata to be associated with a scanned document image, each of the plural metadata entry screens provided in the series depending on metadata entered in one or more previous metadata entry screens in the series;
    (b) capturing the metadata entered through the metadata entry screens provided on the operational display of the multi-function output apparatus having the document scanner;
    (c) causing, upon user confirmation by the apparatus user on the operational display of the multi-function output apparatus of the metadata entered through the metadata entry screens provided on the operational display of the multi-function output apparatus having the document scanner, the metadata entry screens to be customized based on the captured metadata, which was user-entered via the operational display of the multi-function output apparatus, and causing the customized metadata entry screens to be registered as a customized workflow including plural sequential metadata entry screens for the authenticated apparatus user; and
    (d) providing, in another scanning session of the authenticated apparatus user after the customized workflow has been registered, the customized workflow, including the plural sequential metadata entry screens capturing the metadata entered by the apparatus user, through the metadata interface, for user selection in connection with one or more additional documents scanned or to be scanned by the document scanner of the multi-function output apparatus.

2. The multi-function output apparatus of claim 1, wherein the method performed by the multi-function output apparatus further comprises:
    controlling the metadata interface to display a summary of the entered metadata on the operational display, for user confirmation, prior to registration of the entered metadata in association with the scanned document image.

3. The multi-function output apparatus of claim 1, wherein the metadata interface provides one or more pre-scan metadata entry screens on the operational display of the multi-function output apparatus, prior to scanning of the document, and the metadata interface displays a pre-scan summary of metadata entered via the one or more pre-scan metadata entry screens.

4. The multi-function output apparatus of claim 3, wherein metadata items individually displayed in the pre-scan summary are selected by default, and the metadata interface permits the authenticated apparatus user to de-select a metadata item, on an item-by-item basis.

5. The multi-function output apparatus of claim 1, wherein the metadata interface provides one or more post-scan metadata entry screens on the operational display of the multi-function output apparatus, and the metadata interface displays a post-scan summary of metadata entered via the one or more post-scan metadata entry screens, for user confirmation, prior to registration of the entered metadata in association with the scanned document image.

6. The multi-function output apparatus of claim 5, wherein metadata items individually displayed in the post-scan summary are selected by default, and the metadata interface permits the authenticated apparatus user to de-select a metadata item, on an item-by-item basis.

7. The multi-function output apparatus of claim 1, wherein upon sign-on by the authenticated apparatus user to the multi-function output apparatus after the customized workflow has been registered, a workflow trigger part is provided on the operational display, for the authenticated user to trigger the customized workflow.

8. The multi-function output apparatus of claim 1, wherein at least one of the metadata entry screens in the customized workflow of the authenticated apparatus user includes a control part that is not present in the selected workflow.

9. The multi-function output apparatus of claim 1, wherein the selected workflow includes a default candidate data list, the metadata interface providing the default candidate data list for user selection of metadata to be associated with the scanned document image, and the customized workflow includes a customized candidate data list corresponding to the default candidate data list, the customized candidate data list includes one or more data that was entered by the authenticated apparatus user and that is not on the default candidate data list.

10. The multi-function output apparatus of claim 1, wherein the metadata interface employs the captured metadata to populate the metadata entry screens for another document scanned by the authenticated apparatus user, and requests the authenticated apparatus user to confirm or replace the metadata automatically inserted in the metadata entry screens for said another document.

11. The multi-function output apparatus of claim 1, further comprising a workflow edit interface to edit the customized workflow after the customized workflow has been registered,
wherein the workflow edit interface provides each of the captured metadata registered with the customized metadata entry screens, and selected by default, for unselection by the apparatus user, and unselected metadata is not retained in the customized workflow, and
wherein when the customized workflow is invoked for another document, the authenticated apparatus user is prompted to enter another metadata at a portion of the customized that was associated with the unselected metadata.

12. The multi-function output apparatus of claim 1, wherein
the metadata interface provides a data selection interface part for user selection of data from a database accessible from the multi-function output apparatus, to be associated as metadata to the scanned document image.

13. The multi-function output apparatus of claim 12, wherein the metadata interface causes the data selected from the database to be displayed on the operational display of the multi-function output apparatus, for user confirmation, prior to registration of the data as metadata in association with the scanned document image.

14. A method for controlling metadata registration workflow in a multi-function output apparatus comprising an operational display, a document scanner to scan a document in a scanning session of an authenticated apparatus user, and a processor and a non-transitory medium embodying a program of instructions executable by the processor to configure said multi-function output apparatus to perform the method comprising:
(a) providing, on the operational display of the multi-function output apparatus having the document scanner and via a metadata interface, a series of plural metadata entry screens, associated with a selected workflow, for user entry of metadata to be associated with a scanned document image, each of the plural metadata entry screens provided in the depending on metadata entered in one or more previous metadata entry screens in the series;
(b) capturing the metadata entered through the metadata entry screens provided on the operational display of the multi-function output apparatus having the document scanner;
(c) generating a post-scan summary of the captured metadata and providing, via the metadata interface, the post-scan summary on one or more post-scan metadata entry screens on the operational display of the multi-function output apparatus for user confirmation of the captured metadata and to permit user modification of the captured metadata, prior to registration of the entered metadata in association with the scanned document image;
(d) causing, upon confirmation by the apparatus user on the operational display of the multi-function output apparatus by the authenticated apparatus user of the metadata entered through the metadata entry screens provided on the operational display of the multi-function output apparatus having the document scanner, the metadata entry screens to be customized based on the captured metadata, which was user-entered via the operational display of the multi-function output apparatus, and the user modification of the captured metadata in the one or more post-scan metadata entry screens, and causing the customized metadata entry screens to be registered as a customized workflow including plural sequential metadata entry screens for the authenticated apparatus user; and
(e) providing, another scanning session of the authenticated apparatus user after the customized workflow has been registered, the customized workflow, including the plural sequential metadata entry screens, through the operational display, for user selection in connection with one or more additional documents scanned or to be scanned by the document scanner of the multi-function output apparatus.

15. The method of claim 14, further comprising:
displaying a summary of the entered metadata on the operational display, for user confirmation, prior to registration of the entered metadata in association with the scanned document image.

16. The method of claim 14, further comprising:
providing one or more pre-scan metadata entry screens on the operational display of the multi-function output apparatus, prior to scanning of the document;
displaying a pre-scan summary of metadata entered via the one or more pre-scan metadata entry screens, wherein metadata items individually displayed in the pre-scan summary are selected by default; and
permitting the authenticated apparatus user to de-select a metadata item, on an item-by-item basis.

17. The method of claim 14, further comprising:
providing one or more post-scan metadata entry screens on the operational display of the multi-function output apparatus; and
displaying a post-scan summary of metadata entered via the one or more post-scan metadata entry screens, for user confirmation, prior to registration of the entered metadata in association with the scanned document image, wherein metadata items individually displayed in the post-scan summary are selected by default; and
permitting the authenticated apparatus user to de-select a metadata item, on an item-by-item basis.

18. The method of claim 14, further comprising:
employing the captured metadata to populate the metadata entry screens for another document scanned by the authenticated apparatus user; and
requesting the apparatus user to confirm or replace the metadata automatically inserted in the metadata entry screens for said another document.

19. The method of claim 14, further comprising:
providing a workflow edit interface to edit the customized workflow after the customized workflow has been registered, wherein the workflow edit interface provides each of the captured metadata registered with the customized metadata entry screens, and selected by default, for unselection by the apparatus user, and unselected metadata is not retained in the customized workflow; and
invoking the customized workflow for another document, and prompting the apparatus user to enter another metadata at a portion of the customized that was associated with the unselected metadata.

20. The multi-function output apparatus of claim 1, wherein in each subsequent metadata entry screen after a first metadata entry screen in the series of plural metadata entry screens providing plural metadata candidates to permit user selection of a metadata candidate amongst the plural metadata candidates, each of the plural metadata candidates provided in the subsequent metadata entry screen (i) depends on metadata entered in one or more previous metadata entry screens in the series and (ii) is provided upon determining, after receiving the metadata entered in the previous metadata entry screen, that the subsequent metadata entry screen is to be presented.

* * * * *